United States Patent
Unbehagen et al.

(10) Patent No.: US 8,024,437 B2
(45) Date of Patent: Sep. 20, 2011

(54) AUTODISCOVERY FOR VIRTUAL NETWORKS

(76) Inventors: Paul Unbehagen, Cary, NC (US); Vasile Radoaca, Burlington, MA (US); Praveen Muley, Billerica, MA (US); Shobhan Lakkapragada, Billerica, MA (US)

( * ) Notice: Subject to any disclaimer, the term of this patent is extended or adjusted under 35 U.S.C. 154(b) by 2327 days.

(21) Appl. No.: 10/753,296

(22) Filed: Jan. 8, 2004

(65) Prior Publication Data
US 2005/0097203 A1 May 5, 2005

Related U.S. Application Data

(60) Provisional application No. 60/515,600, filed on Oct. 30, 2003.

(51) Int. Cl.
*G06F 15/173* (2006.01)
(52) U.S. Cl. ... 709/223; 370/256; 370/360; 370/395.53; 709/238; 709/242; 709/244
(58) Field of Classification Search ......... 709/238–244, 709/223; 370/389, 351, 400, 401, 392, 395.5, 370/395.53, 256, 360
See application file for complete search history.

(56) References Cited

U.S. PATENT DOCUMENTS

| | | | |
|---|---|---|---|
| 6,339,595 B1 | 1/2002 | Rekhter et al. | 370/392 |
| 6,611,863 B1 | 8/2003 | Banginwar | 709/220 |
| 6,628,649 B1 * | 9/2003 | Raj et al. | 370/360 |
| 6,765,881 B1 * | 7/2004 | Rajakarunanayake | 370/256 |
| 7,050,423 B2 * | 5/2006 | Schneider et al. | 370/352 |
| 2003/0177221 A1 * | 9/2003 | Ould-Brahim et al. | 709/223 |
| 2004/0095940 A1 * | 5/2004 | Yuan et al. | 370/395.53 |
| 2004/0223500 A1 * | 11/2004 | Sanderson et al. | 370/395.53 |
| 2005/0044262 A1 * | 2/2005 | Luo | 709/238 |

FOREIGN PATENT DOCUMENTS

WO WO03079614 A1 9/2003

OTHER PUBLICATIONS

Ould-Brahim et al., "Using BGP as an Auto-Discovery Mechanism for Provider-provisioned VPNs", May 2003, Provider Provisioned VPN WG, 12 pages.*
Ould-Brahim et al., "BGP/GMPLS Optical VPNs", Jul. 2001, Provider Provisioned VPN WG, 13 pages.*
Ould-Brahim et al., "BGP/GMPLS Optical VPNs", Jul. 2001, Provider Provisioned VPN WG, 15 pages.*
Eric C. Rosen et al., "Provisioning Models and Endpoint Identifiers in L2VPN Signaling," draft-ietf-l2vpn-signaling-00.txt, Sep. 2003, pp. 1-22.
Hamid Ould-Brahim et al., "Using BGP as an Auto-Discovery Mechanism for Provider-provisioned VPNs," draft-ietf-ppvpn-bgpvpn-auto-05.bd, May 2003, pp. 1-12.

(Continued)

*Primary Examiner* — Yves Dalencourt
*Assistant Examiner* — Michael C Lai
(74) *Attorney, Agent, or Firm* — Withrow & Terranova PLLC (57) ABSTRACT

The present invention facilitates automatic discovery of VPN-related information, which relates to the existence or association of VPNs as supported by provider edge devices in a core network. In particular, the Border Gateway Protocol (BGP) is used to facilitate the automatic discovery, and the provider edge devices are capable of subsequently and automatically triggering Label Distribution Protocol (LDP) processes to facilitate signaling over LDP sessions within the core network.

17 Claims, 5 Drawing Sheets

OTHER PUBLICATIONS

E. Rosen et al., "BGP/MPLS VPNs," http://www.faqs.org/ftp/rfc/pdf/rfc2547.txt.pdf, Mar. 1999, pp. 1-25.

Supplementary European Search Report completed Feb. 1, 2007 for EP 04769730.

International Search Report from PCT/IB2004/003508 mailed Mar. 17, 2005.

Chen, Qi-Mei, et al., "The Core of MPLS—LDP", Electronic Power Automation Equipment, vol. 22, No. 3.

* cited by examiner

AUTODISCOVERY FOR VIRTUAL NETWORKS

This application claims the benefit of U.S. provisional application Ser. No. 60/515,600 filed Oct. 30, 2003, the disclosure of which is hereby incorporated by reference in its entirety.

FIELD OF THE INVENTION

The present invention relates to communications, and in particular to automatically discovering the capabilities of elements supporting virtual private networks and information related thereto.

BACKGROUND OF THE INVENTION

With the advent of the Internet and other public networks, local area networks (LANs) can communicate with other LANs over these public networks to support communications involving data, voice, audio, or video. In an effort to minimize the complexity for devices on a LAN to communicate with devices on another LAN, the communications between the LANs are often supported by emulating the switching techniques employed by the LAN. In other words, the connections supported over the public network are configured to emulate a direct connection to the LAN. These emulated connections are generally referred to as Virtual Private Networks (VPNs), and may support various levels of security to ensure that only authorized users can access the network and that data being transferred cannot be intercepted.

The public network through which the LANs are connected will have numerous routers and switching devices that must be configured to support VPNs. As the network grows and the number of VPNs increases, the difficulty associated with properly updating the network elements to support the VPN grows exponentially. At this time, much of the configuration and provisioning of the network elements is done manually, wherein the network elements are individually provisioned using a command line interface to implement changes in the network or the VPNs that the network supports. As such, there is a need for an efficient and automatic way to update and configure the network elements to support the addition and extension of VPNs, as well as support network growth.

SUMMARY OF THE INVENTION

The present invention facilitates automatic discovery of VPN information, which relates to the existence or association of VPNs as supported by provider edge devices in a core network. In particular, the Border Gateway Protocol (BGP) is used to facilitate the subsequent and automatic discovery, and the provider edge devices are capable of automatically triggering Label Distribution Protocol (LDP) processes to facilitate signaling over LDP sessions within the core network. The VPN information may correspond to the creation of a virtual switching interface (VSI) at a remote provider edge device, and will include an identification for the corresponding VPN, as well as information needed by the receiving provider edge device to use LDP for signaling therebetween, directly or via a route reflector. BGP may also be used to allow the provider edge devices within the core network to negotiate capabilities.

Accordingly, BGP is used for automatically discovering the existence and associations of VPNs across the core network, wherein LDP processes may be automatically triggered as necessary upon completion of the automatic discovery or may be manually provisioned between each peer in a full mesh. The present invention greatly reduces the amount of manual entry of VPN information throughout the mesh formed for the VPN in the core network.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a technique for allowing network devices to automatically configure themselves to support the creation, expansion, and deletion of Virtual Private Networks (VPNs). According to the communication environment 10 illustrated in FIG. 1, a core network 12 supports label-switched communications. At the edges of the core network 12, provider edge devices (PE) 16 facilitate an interface to any number of other network entities or networks through customer edge devices (CE) 14. In one embodiment, label-switched communications are provided between the provider edge devices 16 via numerous provider network devices (PN) 18. In operation, the provider edge devices 16 provide an interface between the label-switched communications provided within the core network 12 and another communication technology supported by the customer edge devices 14, such as Ethernet technology.

Figure 1:
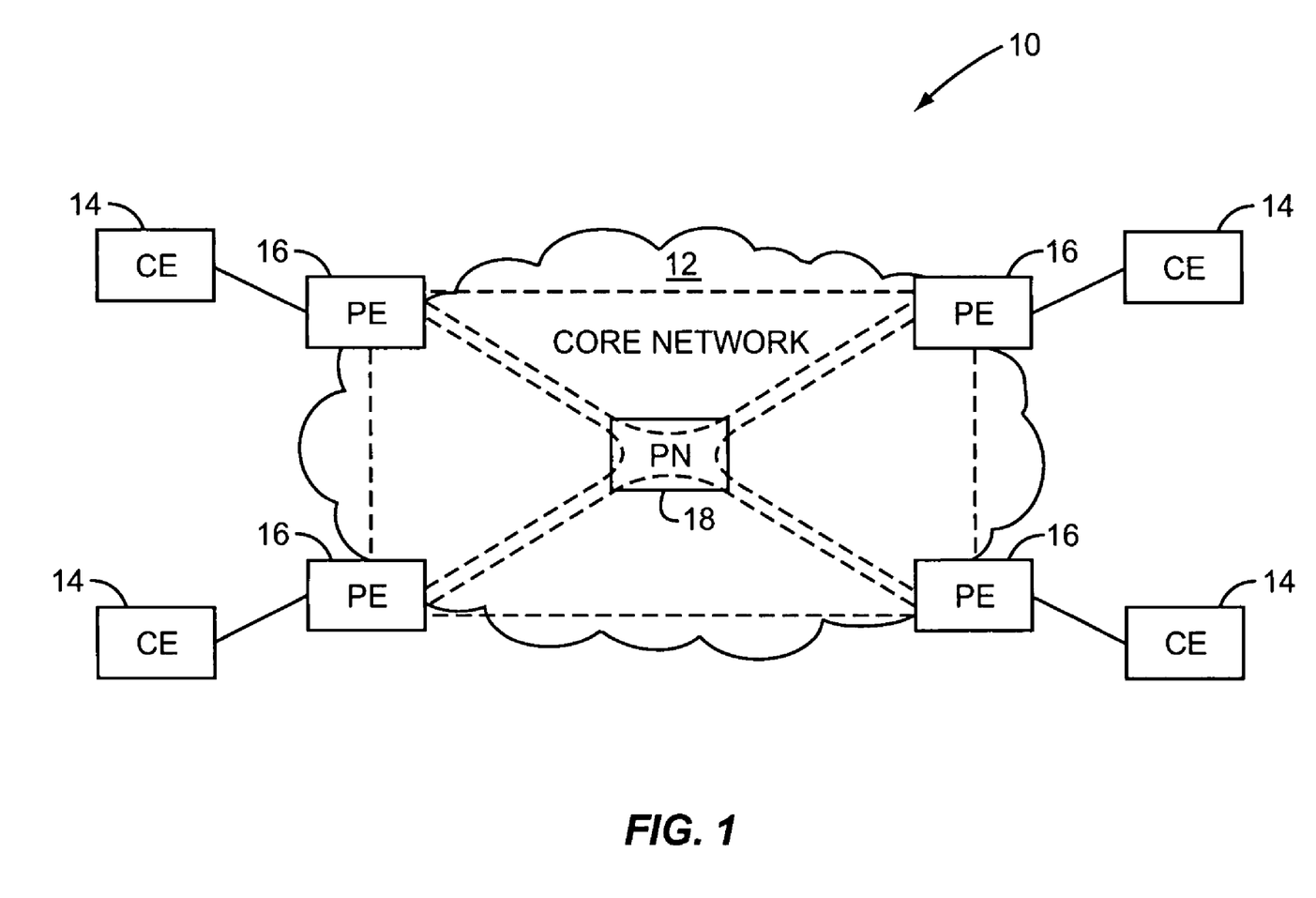
FIG. 1 is a block representation of a communication environment according to one embodiment of the present invention.

In one embodiment, the provider edge devices 16 and the provider network devices 18 cooperate to enable a Virtual Private Local Area Network (LAN) Switching (VPLS) network, which is capable of supporting VPN services among the various customer edge devices 14. For each VPN supported by the core network 12, a corresponding virtual switch interface (VSI) is implemented in the provider edge devices 16, such that the VSI has a label-switched interface to support communications via the core network 12 and has another interface, such as an Ethernet interface, to facilitate communications with the customer edge devices 14.

Figure 2:
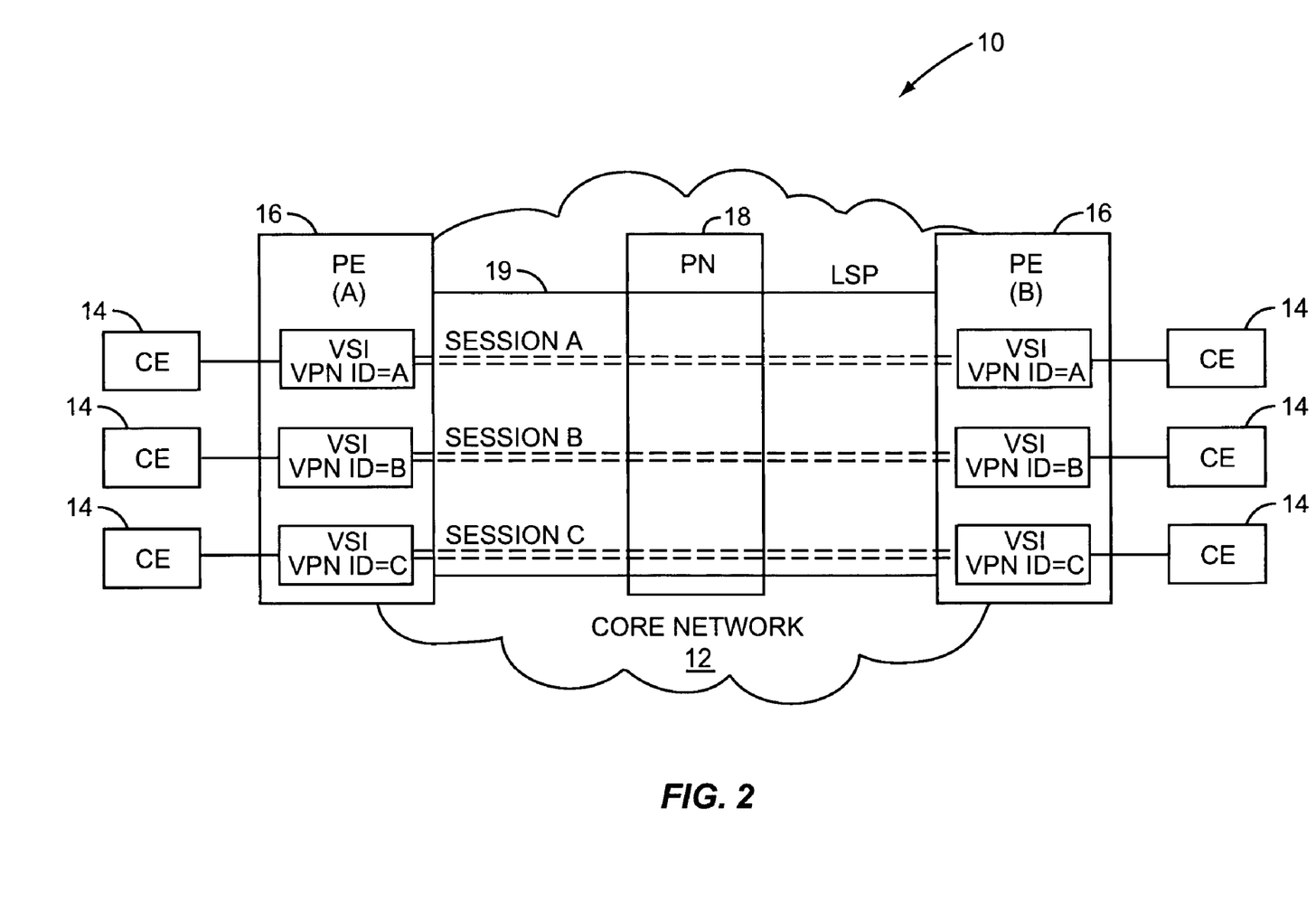
FIG. 2 is a block representation of numerous virtual switching instances supporting corresponding VPNs according to one embodiment of the present invention.

With reference to FIG. 2, a portion of the communication environment 10 is illustrated wherein there are two provider edge devices 16 (A and B), each having three VSIs supporting three different VPNs (A, B, and C) for corresponding customer edge devices 14. In this configuration, the respective VSIs will be administered via a Label Distribution Protocol (LDP) session for VPN services (A, B, and C).

In one embodiment, the core network 12 provides a multi-protocol label-switching (MPLS) architecture, wherein the provider edge devices 16 may be label edge routers (LERs), and the provider network devices 18 within the core network 12 may be label switch routers (LSRs). In an MPLS architecture, labels are appended to data packets being transferred from one edge of the network to another. When packets enter an MPLS architecture, the LERs look at the destination of the packet and any other packet attributes and assign the packet a label. The LERs then assign the data packet to a corresponding label switch path (LSP) 19 by appending labels, and it is sent to a first LSR in the assigned LSP 19. Each LSR along the LSP 19 will forward the data packet along the LSP 19 based on the topmost label, until the packet reaches a destination LER, which will remove the top label and route the packet to the appropriate customer edge device 14 or other appropriate endpoint based on an inner label format.

As the packets travel along the LSP 19, the LSRs may simply monitor the label and forward the packet and labels untouched, or may replace the label with a new label to facilitate routing or switching along the LSP 19. Each LSR will have routing tables based on the labels. Thus, LSPs 19 extend between LERs, which are identified by labels. The LERs assign, add, and remove labels as traffic enters or exits the MPLS architecture. The MPLS architecture allows the establishment of LSPs 19 to support numerous communication sessions among the customer edge devices 14. Those skilled in the art will be familiar with the concepts of establishing LSPs 19 in an MPLS architecture, and in particular to using an LDP to assist in this process.

For supporting VPNs, each VPN will be associated with a VSI established at each of the provider edge devices 16 that is a party to the VPN. Between each of these provider edge devices 16, LSPs 19, or a mechanism to provide tunneling between the two provider edge devices 16 must be formed and VPN sessions may take place along these connections. Notably, multiple VPN advertisements may take place within any one LDP session. Any time a VPN is created to include a customer edge device 14, the supporting provider edge devices 16 must be appropriately configured. Configuration includes the creation of a corresponding VSI in each provider edge device 16 that is a party to the VPN, and each provider edge device 16 must be made aware of all of the other provider edge devices 16 that are parties to the VPN. For example, each provider edge device 16 needs to be able to identify traffic associated with the VPN, as well as where to send traffic in the core network 12 for the associated VPN. Those skilled in the art will recognize how the sessions between the provider edge devices 16 are established using the LDP. The present invention relates to arming each of the provider edge devices 16 with the appropriate information to allow the establishment of the various sessions for VPNs using LDP in an automatic fashion, without requiring manual configuration of the provider edge devices 16 with all the necessary information associated with the VPNs or the VSIs used to support the VPNs.

The present invention uses the border gateway protocol (BGP) to communicate the presence and any necessary information to support the VPN to the affected provider edge devices 16 in an automatic fashion. Accordingly, when a VPN is created or extended, the present invention uses BGP to automatically distribute to the pertinent provider edge devices 16 the information necessary for LDP to establish LDP sessions. The information will generally include an identifier for the VPN, which can be associated with the appropriate VSI, as well as any next-hop information necessary for routing packets along an LSP 19 associated with the VPN, among other information deemed desirable. Further, various provider edge devices 16 may negotiate their respective capabilities prior to or during this configuration process. Each of the provider edge devices 16 will be configured to automatically trigger LDP operations after receiving the appropriate VPN information via the BGP sessions. The present invention is also applicable when a VPN is reduced or removed from the system.

Figure 3A:
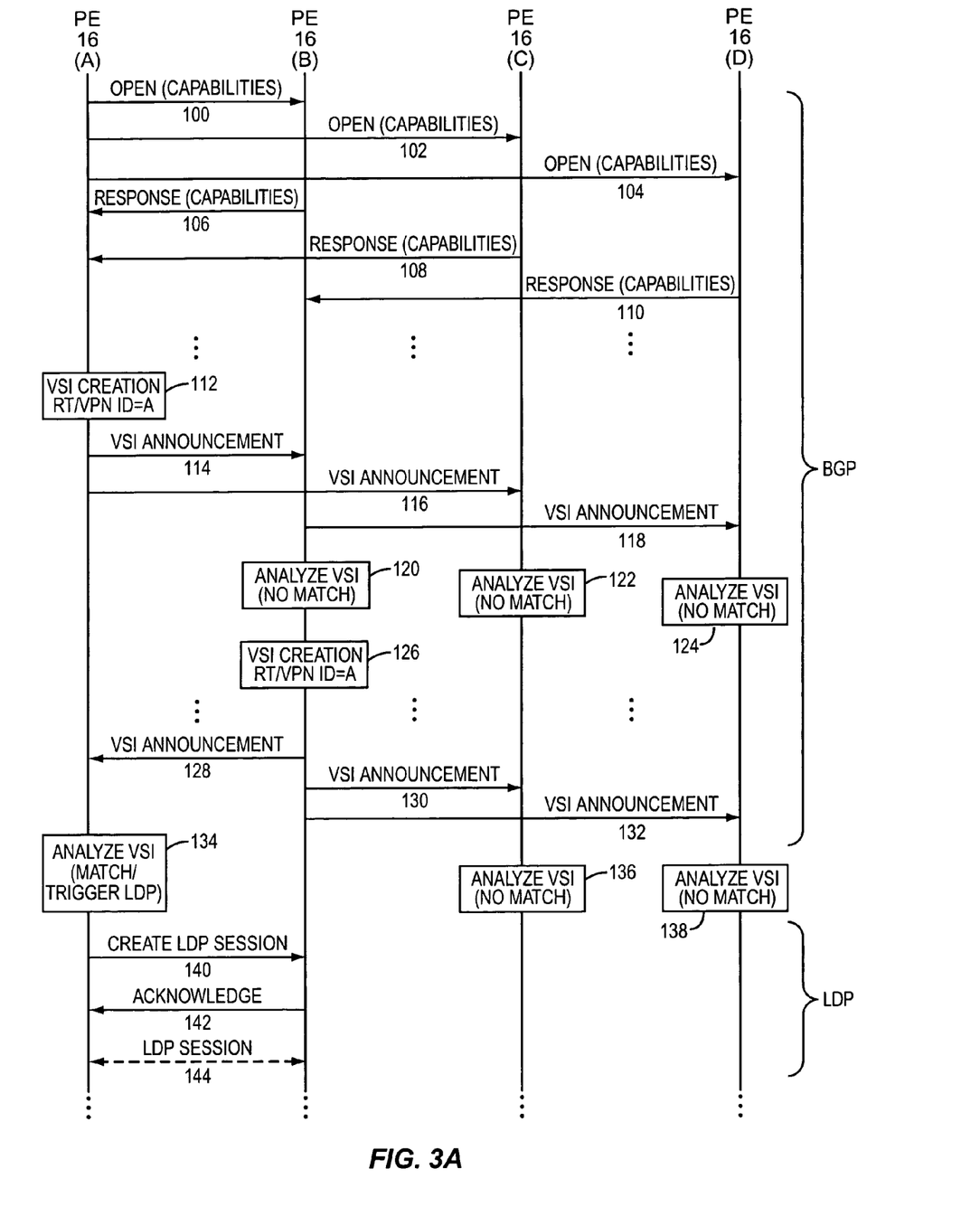
FIGS. 3A and 3B are a communication flow diagram illustrating the operation of one embodiment of the present invention.
Figure 3B:
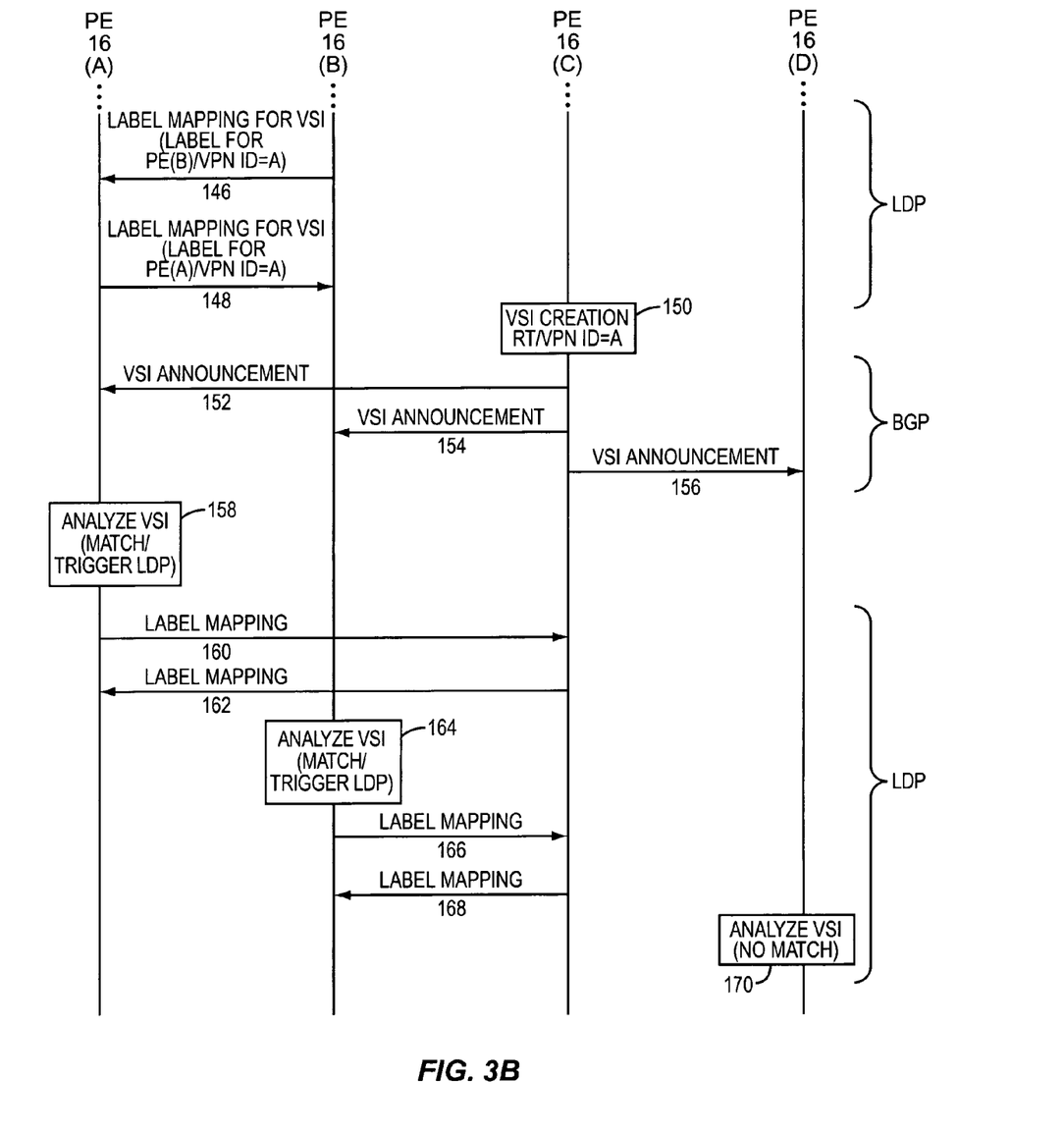

The communication flow of FIGS. 3A and 3B illustrates one embodiment wherein BGP is used to discover the capabilities and membership information for a VPN supported by the core network 12 in an automatic fashion, and wherein LDP sessions or other LDP processes are initiated automatically upon such discovery. In this embodiment, assume that each of the provider edge devices 16 initially negotiates its capabilities, such that each of the provider edge devices 16 knows how to best communicate with the other provider edge devices 16. Notably, the capabilities of the various provider edge devices 16 as well as the provider network devices 18 may vary, and the respective sessions therebetween will vary accordingly. Initially, assume that provider edge devices 16B, 16C, and 16D are already aware of each other and their respective capabilities. When a new provider edge device 16A is associated with provider edge devices 16 (B, C, and D), an OPEN message is sent to each of the provider edge devices 16 (B, C, and D) from provider edge device 16A to initiate the negotiation of their respective capabilities (steps 100, 102, and 104). Each of provider edge devices 16 (B, C, and D) will respond appropriately (steps 106, 108, and 110). This negotiation may require multiple communications back and forth between the various devices to fully negotiate the capabilities of each of the provider edge devices 16. At the end of negotiations, each of the provider edge devices 16 will know the abilities of the other provider edge devices 16 and know how to best communicate with them. These negotiations take place using BGP, and the messages used to negotiate these capabilities may be sent directly between the provider edge devices 16 or to a route reflector, which will facilitate the communications between the provider edge devices 16, as is understood in the art.

Once the capabilities are negotiated, assume that a VSI is created on provider edge device 16A to support a VPN having ID=A (step 112). The VSI will also be associated with information needed by other provider edge devices 16 to build LDP sessions for signaling, and information indicating where to route packets for such signaling. The information may include the next-hop addresses, and is generally referred to as a route target, which may be encoded using a version of the Internet Protocol (IP), such as versions 4 and 5. When a VSI is created for a VPN, provider edge device 16A will send VSI announcements to all the provider edge devices 16 (B, C, and D) that provider edge device 16A is aware of, or to a select provider edge device 16B known to support the VPN (or VSI). In the illustrated embodiment, the VSI announcements are sent to each of provider edge devices 16 (B, C, and D) using BGP, without knowledge of whether or not these provider edge devices 16 (B, C, and D) support the VPN associated with the newly created VSI (steps 114, 116, and 118). Upon receipt of the VSI announcements, each of provider edge devices 16 (B, C, and D) will analyze an internal database to determine whether it has a matching VSI for the corresponding VPN (steps 120, 122, and 124). In this case, there are no matches, as none of provider edge devices 16 (B, C, and D) has a VSI associated with VPN ID=A.

Next, assume that provider edge device 16B creates a VSI for a VPN having ID=A, which is the same as the VSI created in provider edge device 16A (step 126). At this point, provider edge device 16B will send VSI announcements to provider edge devices 16A, 16C, and 16D (steps 128, 130, and 132) using BGP. Provider edge device 16A will analyze the VSI announcement and recognize that the VSI being created on provider edge device 16B is the same as that previously created based on the VPN ID (VPN ID=A) (step 134). As such, provider edge device 16A will trigger LDP operation. In the meantime, provider edge devices 16C and 16D will analyze the VSI announcements and recognize that there are no matches for the VSI being created at provider edge device 16B (steps 136 and 138).

With reference back to provider edge device 16A, a determination is first made to see if an LDP session with provider edge device 16B has been created (step not shown). Assuming the LDP session has not been created, provider edge device 16A will send a message to provider edge device 16B to create an LDP session (step 140), which will be acknowledged by provider edge device 16B (step 142). Notably, each provider edge device 16 will include a state machine, which will recognize the end of the automatic discovery session using BGP, and will trigger an LDP process. The LDP process may entail establishing an LDP session for use, if one does not already exist, or selecting an existing LDP session for use during label matching and further LDP processing.

At this point, an LDP session is established between provider edge devices 16A and 16B (step 144), wherein signaling to facilitate packet communications between provider edge devices 16A and 16B using the VSIs associated with VPN ID=A is facilitated. Upon creation of the LDP session, provider edge device 16B will send label mapping information to provider edge device 16A (step 146), which will in turn provide label mapping information to provider edge device 16B (step 148). The label mapping information will effectively provide labels to use when routing packets to the respective provider edge devices 16 during a communication session involving the VPN (VPN ID=A). The label mapping messages are provided using LDP in extended mode fashion. Notably, triggering of the LDP sessions in light of the VSI announcements is provided in an automatic fashion to facilitate the automatic transition from the discovery process provided using BGP.

At this point, assume that provider edge device 16C creates a VSI for the VPN ID=A (step 150) to indicate the customer edge device 14 associated with provider edge device 16C is joining the VPN. As such, provider edge device 16C will send VSI announcements indicating the creation of a VSI to provider edge devices 16A, 16B, and 16D (steps 152, 154, and 156) using BGP. Provider edge device 16A will analyze the VSI announcement and recognize that the VSI created at provider edge device 16C matches one already created, and thus, trigger the LDP process (step 158). Assume that LDP sessions to support the LDP process are already in existence between provider edge devices 16A and 16C, as well as between provider edge devices 16B and 16C. According to the LDP process, a label mapping message is then provided to provider edge device 16C (step 160), which will respond by sending a label mapping message back to provider edge device 16A (step 162) using LDP. Thus, provider edge devices 16A and 16C have the respective label information for sending packets therebetween.

Similarly, provider edge device 16B will recognize that it has a VSI corresponding to that created at provider edge device 16C and will trigger the LDP process (step 164). Provider edge devices 16B and 16C will then send corresponding label mapping messages back and forth to provide the respective labels for communicating between provider edge devices 16B and 16C (steps 166 and 168). Provider edge device 16D will analyze the VSI announcement and recognize that there is no VSI match (step 170). At this point, LDP sessions exist among provider edge devices 16A, 16B, and 16C, and call signaling for label-switched communications may take place in extended mode fashion using a mesh of virtual connections throughout the core network 12.

Accordingly, the autodiscovery technique of the present invention uses BGP to provide the various provider edge devices 16, as well as the provider network devices 18, all the necessary information to keep track of the network topology, their respective capabilities, and the existence of VPNs or associated VSIs to allow LDP sessions to be established. With the use of the BGP sessions for automatic discovery of network changes associated with VPNs and the VSIs that support them, and the automatic triggering of LDP processes, there is no need to manually configure the affected provider edge devices 16 and provider network devices 18. For BGP to facilitate the present invention, additional Address Family Identifier (AFI) and Subsequent Address Family Identifier (SAFI) will be defined to indicate that information pertaining to the creation of VSIs, their respective VPNs, or other VPLS information is present in the BGP message.

Figure 4:
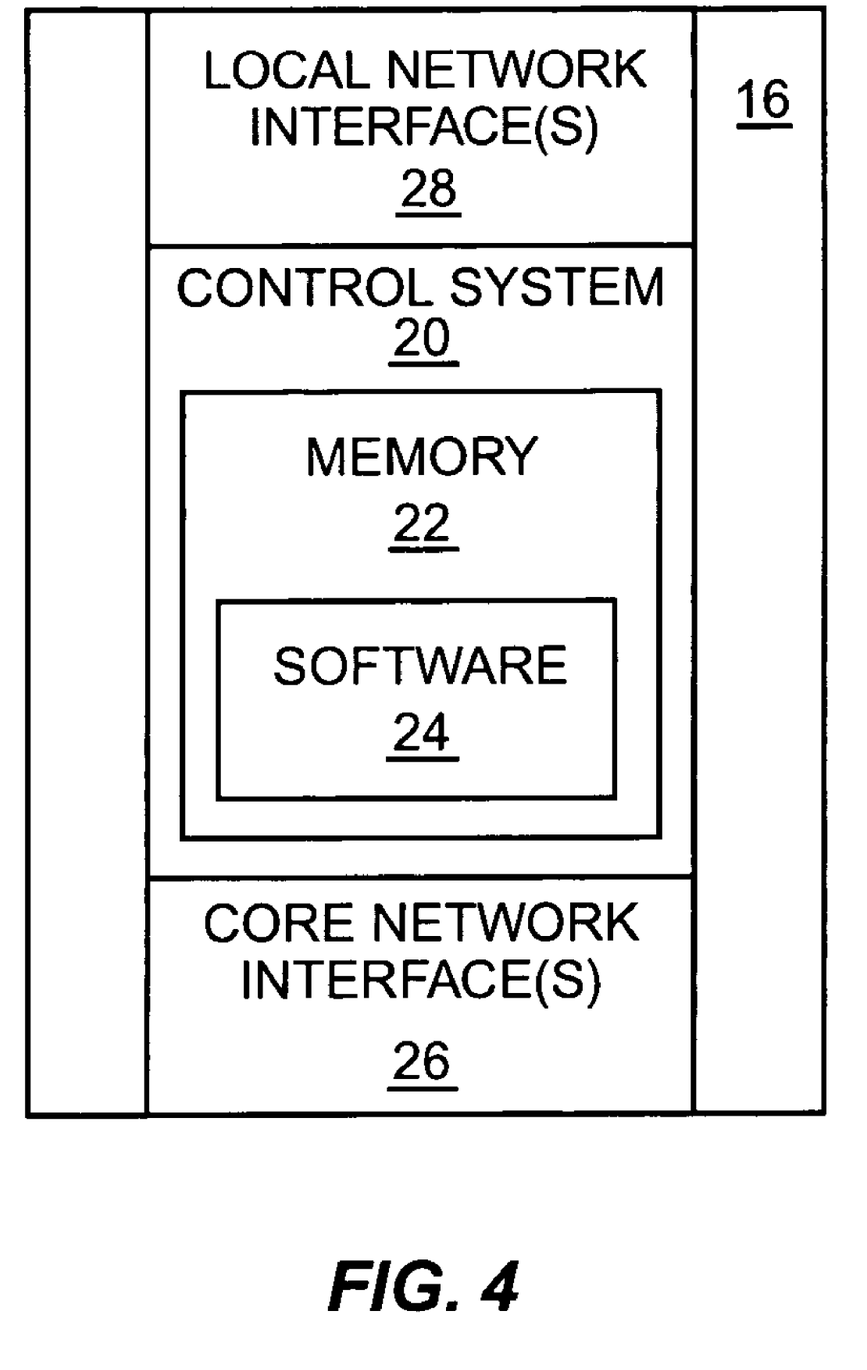
FIG. 4 is a block representation of a provider edge device according to one embodiment of the present invention.

Turning now to FIG. 4, a provider edge device 16, which may be implemented as a label edge router, is illustrated according to one embodiment of the present invention. The provider edge device 16 will include a control system 20 having memory 22 with sufficient software 24 to provide the functionality above. The control system 20 will cooperate with one or more core network interfaces 26 as well as local network interfaces 28 to allow communications over the core network 12 and to the customer edge devices 14, respectively.

Those skilled in the art will recognize improvements and modifications to the preferred embodiments of the present invention. All such improvements and modifications are considered within the scope of the concepts disclosed herein and the claims that follow.

What is claimed is:

1. A method for facilitating automatic discovery of virtual private network (VPN) information among provider edge devices in a core network comprising:
   a) negotiating communication capabilities with a remote provider edge device using border gateway protocol (BGP);
   b) receiving first information bearing on provisioning a VPN using BGP, wherein the first information bears on creation of the VPN on the remote provider edge device, and the first information bears on creation of a virtual switch interface (VSI) to support the VPN;
   c) determining if a local VSI corresponding to the VSI exists; and
   d) automatically initiating a label distribution protocol (LDP) process using LDP in response to receiving the first information if it is determined that a local VSI corresponding to the VSI exists.

2. The method of claim 1 further comprising establishing a LDP session to facilitate the LDP process.

3. The method of claim 2 further comprising determining if the LDP session is not established, prior to establishing the LDP session.

4. The method of claim 1 wherein the first information comprises a VPN identifier.

5. The method of claim 4 wherein the first information comprises next-hop information associated with a label switch path.

6. The method of claim 4 wherein the first information comprises a route target.

7. The method of claim 1 further comprising:
   a) creating a virtual switch interface (VSI) to support the VPN; and
   b) sending a VSI announcement message to at least one provider edge device.

8. The method of claim 1 wherein the core network supports label switching for virtual private local area network switching and further comprises:
   a) facilitating a label-switched interface for facilitating communications over the core network; and
   b) facilitating a local network interface for facilitating communication with a customer edge device.

9. A system for facilitating automatic discovery of virtual private network (VPN) information among provider edge devices in a core network comprising:
   a) a label-switched interface for facilitating communications over the core network;
   b) a local network interface for facilitating communications with a customer edge device; and
   c) a control system associated with the label-switched interface and the local network interface, wherein the control system:
      i) negotiates communication capabilities with a remote provider edge device using border gateway protocol (BGP);
      ii) receives first information bearing on provisioning a VPN using BGP, wherein the first information bears on creation of the VPN on the remote provider edge device, and the first information bears on creation of a virtual switch interface (VSI) to support the VPN;
      iii) determines if a local VSI corresponding to the VSI exists; and
      iv) automatically initiates a label distribution protocol (LDP) process using LDP in response to receiving the first information if it is determined that a local VSI corresponding to the VSI exists.

10. The system of claim 9 wherein the control system further establishes a LDP session to facilitate the LDP process.

11. The system of claim 10 wherein the control system further determines if the LDP session is not established, prior to establishing the LDP session.

12. The system of claim 9 wherein the first information comprises a VPN identifier.

13. The system of claim 12 wherein the first information comprises next-hop information associated with a label switch path.

14. The system of claim 12 wherein the first information comprises a route target.

15. The system of claim 9 wherein the control system further:
   a) creates a virtual switch interface (VSI) to support the VPN; and
   b) sends a VSI announcement message to at least one provider edge device.

16. The system of claim 9 wherein the core network supports label switching for virtual private local area network switching over the core network.

17. A system for facilitating automatic discovery of virtual private network (VPN) information among provider edge devices in a core network comprising:
   a) means for negotiating communication capabilities with a remote provider edge device using border gateway protocol (BGP);
   b) means for receiving first information bearing on provisioning a VPN using BGP, wherein the first information bears on creation of the VPN on the remote provider edge device, and the first information bears on creation of a virtual switch interface (VSI) to support the VPN;
   c) means for determining if a local VSI corresponding to the VSI exists; and
   d) means for automatically initiating a label distribution protocol (LDP) process using LDP in response to receiving the first information if it is determined that a local VSI corresponding to the VSI exists.

* * * * *